United States Patent [19]

Shemyakin et al.

[11] 4,405,231

[45] Sep. 20, 1983

[54] DEFORMOGRAPH

[76] Inventors: Evgeny I. Shemyakin, ulitsa Pravdv, 1, kv. 32; Gennady I. Kulakov, ulitsa Rossiiskaya, 15, kv. 39, both of Novosibirsk, U.S.S.R.

[21] Appl. No.: 304,387

[22] Filed: Sep. 22, 1981

[51] Int. Cl.³ .................. G01B 11/18; G01L 1/24; G01L 33/24
[52] U.S. Cl. .................................... 356/34; 73/768; 73/784; 73/800
[58] Field of Search ................... 356/33–35; 73/762, 768, 775, 784, 800

[56] References Cited

U.S. PATENT DOCUMENTS 3,256,768  6/1966  Nisida .......................... 356/34
3,313,205  4/1967  Roberts et al. ................ 356/33
4,123,158  10/1978  Reytblatt .................... 73/80

FOREIGN PATENT DOCUMENTS 464778  7/1975  U.S.S.R. ....................... 73/784

Primary Examiner—William H. Punter
Attorney, Agent, or Firm—Fleit, Jacobson, Cohn & Price

[57] ABSTRACT

A deformograph comprises a sensitive element shaped as a tube of an optically sensitive material and fixed in a borehole by cementing the gap between said tube and walls of the borehole. One end of the tube is tapered off and provided with a specular coating, while the other end thereof has a specular coating with transparent sections. There are also provided a polarized light source furnishing a light signal transmitted through the material of the tube, and a sensing unit designed to pick off from the sensitive element a useful light signal indicative of the changing condition of the earth's crust in a given area.

5 Claims, 4 Drawing Figures

DEFORMOGRAPH

The present invention relates to seismometry and geotectonics and in particular to deformographs for recording deformations and stresses in the earth's crust.

The invention may be used to advantage in keeping check on deformations and stresses in the earth's crust to foresee earthquakes in seismic regions and also in measuring seismic and geotectonic deformations and stresses of the earth's crust due to abyssal processes.

Besides, the invention may be used in the study of short- and long-time deformations and stresses in the earth's crust due to tidal processes and weather effects. It may also find applications in the study and measurements of technogenic deformations and stresses attributed to additional loads on the earth's surface in areas where large water storage basins or other hydraulic structures and industrial installations are being built.

Lack of information on the condition and properties of the earth's crust in earthquake prediction and also in the study of tidal and technogenic deformations of the earth's crust and its tectonic movement due to abyssal processes makes it generally difficult to forsee such phenomena and take appropriate practical measures.

The number of the known facilities for measuring deformations of the earth's crust in the above instances is fairly small, their operating principle consisting in most cases in measuring linear increments in displacements and slopes.

In the above instances there are essentially no suitable devices enabling measurements with one instrument of two or more components of the earth's crust deformation tensor. Prior art devices do not permit measuring stress tensors in the earth's crust in earthquake prediction, in the study of tectonic movement and so forth. Conventional mining instruments and methods for measuring deformation and stresses in walls of a working, more specifically deformeters, hydrosensors, and photoelastic detectors provide deformation sensitivity not over $10^{-3}$ to $10^{-5}$ and are totally unfit for seismic and geotectonic measurements wherein the required sensitivity is $10^{-8}$ to $10^{-10}$ or better. Furtheremore, such devices are essentially point units, a disadvantage making it impossible to average measured values on base-lines having a length sufficient to permit seismic measurements.

Known in the mining art are borehole photoelastic detectors for measuring variations of components of deformation or stress tensor acting in the same plane. Such detectors are fabricated from optically sensitive materials. An elementary detector of the type is a small glass cylinder with an axial hole. The length of the cylinder is not in excess of 1 to 5 cm, its outside diameter being normally within 2.5–4.0 cm, while the inside diameter is within 0.5–0.8 cm. Such a detector is installed in a through hole drilled between adjacent workings and is cemented to its walls. Stresses arise in the detector during deformation of rock. As the detector is subjected to polarized light, there appears an optical pattern due to the photoelastic effect (a phenomenon characterized by the appearance of artificial optical anisotropy of an optically sensitive material under the action of stresses therein whereby a beam of light passed through said material is subjected to double refraction). For observation use is made of a polariscope composed of two polarizing filters. One of the filters (polarizer) is arranged together with a light source on one side of the detector, while the other filter (analyzer) is disposed on the other side of the detector. A beam of light from the light source passes through the polarizer and enters the material of the detector as a polarized beam. In the detector due to the photoelastic effect the light beam is decomposed into two beams: an ordinary beam whose oscillation plane corresponds to the incoming beam, and an extraordinary beam oscillating in a direction normal to the oscillations of the incoming beam. The beams propagate in the material of the detector at different speeds, and the resultant path difference (oscillation phase shift) is proportional to the stresses arising in the detector. The two light beams leaving the detector get into the analyzer wherein their oscillation planes are aligned. An optical pattern is, thus, obtained due to interference. When working with white light said pattern represents alternating colour strips known as isochromes. Observing the pattern it is possible to determine the direction, sign and value of two extremal (or quasi-predominant) deformations occurring in the plane perpendicular to the detector axis.

Known in the art is a photoelastic detector with a specular layer. As distinct from the aforesaid detector, one of the end surfaces of the glass cylinder is provided with a specular coating.

Such a detector is placed in a hole with its specular layer facing the bottom of the hole. For observation use is made of single-action polariscopes. A light beam passes through the detector, is reflected from the specumlar coating and returns to the mouth of the borehole.

If the modulus of elasticity of the material from which the aforesaid detectors are fabricated is smaller than the modulus of elasticity of the rock, the detector will furnish information on deformations within the rock. Conversely, if the modulus of elasticity of the material of the detector is greater than the modulus of elasticity of the rock, the foregoing detector will supply information on stresses arising within the rock.

The indications of the photoelastic borehole detectors are interpreted by solving a problem from the theory of elasticity, which relates to a state of stress and deformation of a surface comprising an elastic isotropic homogeneous material slackened with a round hole reinforced by an elastic ring and loaded by evenly distributed forces. The solution shows that the optical pattern in the detector permits determining the direction and value of two main stresses of a field of forces applied to the rock after the installation of the detector. Knowing the above values it is possible to determine three components of a tensor of stresses arising in the plane perpendicular to the detector axis. Using the above solution it may be concluded that information on stresses is supplied by an inflexible detector and that on deformations by a flexible detector.

However, the aforementioned photoelastic borehole detectors provide deformation sensitivity not over $10^{-4}$ to $10^{-5}$, a level absolutely insufficient for measuring seismic and geotectonic deformations of the earth's crust and the corresponding stresses.

Also known in the art is a photoelastic borehole detector comprising a glass cylinder 3.8 cm in length and 3.6 cm in diameter, the diameter of its axial hole being 0.5 cm, a capsule containing a light source, and a polarizing filter arranged between the capsule and the glass cylinder.

The capsule fabricated from acrylic plastic has a socket with an electric lamp. The parabolic rear surface of the capsule is coated with a specular layer, a feature allowing creation of a pencil of light beams coming to the glass cylinder. The detector is installed in a hole, its glass cylinder being cemented to the walls thereof. As the rock is deformed, stresses arise in the glass cylinder, which are indicative of the increasing deformations or stresses within the rock.

An optical pattern may be observed on application of voltage to the lamp through the polarizing filter acting as an analyzer. The light coming from the lamp strikes the parabolic specular surface of the capsule and is reflected therefrom. Passing through the capsule and the polarizing filter arranged between the capsule and the glass cylinder it gets into said cylinder, passes the latter and comes to the analyzing filter located in front of the mouth of the hole. In other respects the operation of the detector is essentially similar to that of the aforesaid photoelastic detector.

The foregoing detector has basically the same disadvantage. Its deformation sensitivity is not over $10^{-4}$ to $10^{-5}$, a level absolutely insufficient for measuring seismic and geotectonic deformations.

Known in the art are deformographs specially designed for measuring seismic and geotectonic deformation in the earth's crust. There are generally wire and rod deformographs.

An elementary wire deformograph comprises a length of wire having its ends secured to fixed members, and a load suspended from the middle of the wire. The equipment records a change in the sag of the wire occurring as the distance between the fixed members to which the wire ends are attached changes.

Such deformographs have been generally unsatisfactory due to calibration difficulties and presence of an instrumental drift. Furthermore, the aforesaid deformographs have a comparatively low accuracy in measuring sustained movements.

Other known rod deformographs incorporate a primary element formed with a quartz-glass tube some tens of meters long, which is maintained in a substantially horizontal position by a system of supporting members.

One end of the tube is secured to a fixed member, while its other end is free to move with respect to the fixed member as the rock is expanded or compressed.

In the present-day rod deformographs the tube length amounts to 100 m, the tube diameter varies within 10-100 mm, while the walls are 2 to 5 mm thick. The deformograph normally comprises suitably interconnected lengths of tubes.

Known in the art are various recording systems designed to pick up a signal from deformographs. Displacing the tube (normally by a suitable mechanical appliance) causes the specular surface to turn, said turn being recorded by photooptical means.

The rod deformographs provide deformation sensitivity of $10^{-8}$ to $10^{-10}$, a level conforming to the present-day precision requirements in seismic and geotectonic measurements.

The deformographs are installed in special chambers deep in the ground to avoid the effect of temperature variations.

The prior art rod deformographs have been generally unsatisfactory due to an excessively long tube, a limitation necessitating the use of large underground chambers. Another disadvantage of the aforesaid deformographs is a small amount of data obtained. Such deformographs may be used only for measuring only one linear deformation in the direction coincident with the tube axis. Moreover, the aforementioned deformographs are totally unfit for direct stress measurements.

It is an object of the present invention to increase the amount of information obtained in measurements with a view to guiding a better knowledge of processes occurring in the earth's crust in seismic regions.

Another object of the invention is to provide a simple and reliable deformograph for detecting deformations associated with earthquakes and movements of the earth's crust due to abyssal processes.

One more object of the invention is to provide a simple small-size deformograph for studying technogenic deformations and stresses associated with additional artificial loads on the earth surface.

The foregoing objects are accomplished by that a deformograph comprising a sensitive element shaped as a tube, and a sensing unit designed to pick up from the sensitive element a useful signal indicative of the changing condition of the earth's crust, according to the invention, includes a polarized light source, while the tube is made of an optically sensitive material and is fixed in a borehole by cementing the gap between the tube and walls of said borehole, one of ends of the tube being tapered off and provided with a specular coating, while its other end has a specular coating with transparent sections enabling passage of a light beam through the material of the tube and its output after being reflected from the specular coating of the tapered portion.

Such construction of the deformograph allows simultaneous measurements of three deformation tensor components with the tube manufactured from a material whose modulus of elasticity is smaller than the modulus of elasticity of the rock or of three stress tensor components, if the tube is made of a material whose modulus of elasticity is greater than the modulus of elasticity of the rock.

The deformograph forming the subject of the present invention is constructionally simple and reliable and supplies a greater amount of information, an advantage enabling measurements of deformation and stresses to foresee earthquakes and observation of movements of the earth's crust due to abyssal processes.

The hereinproposed deformograph is a small-size device suitable for the study of technogenic deformations and stresses associated with additional loads on the earth surface in construction.

Smaller dimensions of the deformograph make it possible to appreciably reduce the volume of underground chambers at seismic stations.

In another embodiment of the invention the tapered specular end surface of the tube has transparent sections providing output of a light beam to a sensing unit, said beam coming from the light source arranged on the side of the opposite end.

Such a tapered specular surface permits locating the tube of the deformograph in a through borehole between two chambers.

Desirably the transparent sections of the specular coatings represent concentric rings which makes easier taking readings from the deformograph and their interpretation.

Preferably the deformograph tube has a length providing sensitivity of $10^{-8}$ to $10^{-10}$ or better in measuring deformations of the earth's crust.

Such sensitivity permits seismic measurements.

The invention will now be described with reference to specific embodiments thereof, taken in conjunction with the accompanying drawings, wherein.

Figure 1:
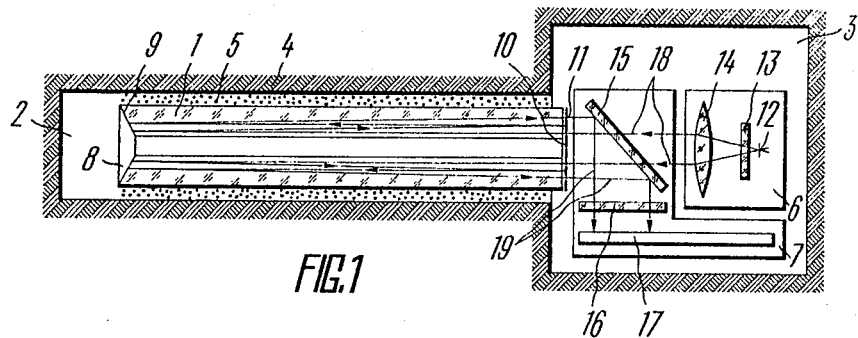
FIG. 1 is a general view of a deformograph according to the invention with a light source and a light detector contained in one chamber.

Referring to the drawings the deformograph forming the subject of the present invention comprises a tube 1 contained in a hole 2 drilled from a chamber 3 (FIG. 1) in a rock 4. A self-curing cement 5 fills the gap between the walls of the tube 1 and the walls of the borehole 2. Placed before the front end of the tube 1 are a polarized light source 6 and a polarization recorder 7 (sensing unit). The tube 1 is made of an optically sensitive material, say, optical glass. The material is optically sensitive when it is transparent, and becomes optically anisotropic when subjected to stresses. If the material is loaded and checked by the use of a special device (polariscope) with polarized light, there will be observed a specific optical pattern of alternating colour strips (with a white light source) or light and dark strips (with a monochromatic light source). The above phenomenon is known as the photoelastic effect consisting in that a light beam entering such a stressed material is decomposed into two coherent beams with mutually perpendicular oscillation planes. In the material said beams propagate at different speeds, a factor resulting in a phase shift therebetween. Due to this, an optical pattern is formed after summation and interference of the beams.

Optically sensitive substances are soda-lime glass, solidified epoxy resin, celluloid, certain polystyrenes, and the like.

The rear end surface of the tube 1 has a tapered portion 8 representing a truncated cone with a small angle at the base and provided with a specular coating (layer) 9. The front end surface of the tube 1 has a specular layer 10 with transparent sections 11.

The polarized light source 6 comprises a light source 12, a polarizing filter 13, and a condenser 14. The condenser is designed to produce a pencil of parallel light beams.

The polarization recorder 7 includes, for example, a translucent plane-parallel plate 15, a polarizing filter 16, and a receiver 17. The recorder is designed to receive and record signals, the subsequent operations being their conversion and transmission.

The deformograph forming the subject of the present invention operates in the following manner. As the rock 4 surrounding the borehole 2 is deformed, the tube 1 is also deformed. Stresses arise in the material of the tube, their value and distribution within the sectional area of the tube 1 being conditioned by the value and direction of main deformations or stresses within the rock, which occur after the installation of the tube 1. From the solution of an elasticity problem pertaining to interaction of an elastic tube attached to an elastic isotropic homogeneous rock it is known that isolines representing maximum tangent stresses in the sectional area of the tube have two axes of symmetry, which coincide with the direction of main deformations in the rock when the material of the tube is softer than the rock or with the directions of main stresses if the material of the tube is harder than the rock.

Accordingly, the observed optical pattern of strips (isochromes) with polarized light will precisely correspond to the isolines representing maximum tangent stresses and will also have two axes of symmetry coincident with the directions of main deformations in the rock with the material of the tube being soft or with the directions of main stresses in the rock with the tube material being hard. The arrangement of a strip at each fixed point of the optical pattern is proportional to a variation of deformations (stresses) within the rock.

Thus, observng an optical pattern in the tube 1 with polarized light it is possible to determine the value, sign and direction of two main deformations (or stresses) within the rock which appear after installation of the tube and act in a plane perpendicular to the axis of said tube. Knowing the above data it is no problem to compute three components of deformation tensor or three components of stress tensor in any randomly chosen coordinate system lying in the same plane.

Information is taken off the tube 1 by the use of a polarized light beam 18 (two such beams are depicted in FIG. 1). The beam 18 from the light source 12 passes through the polarizing filter 13, condenser 14 and enters as a polarized beam the wall of the tube 1 through the transparent section 11 of the specular layer 10.

Passing through the optically sensitive stressed material of the tube 1 the beam 18 is decomposed into two beams due to optical anisotropy of the material of the tube attributed to stresses arising therein.

Said two beams propagating at different speeds acquire a certain path difference due to an oscillation phase shift thereof. The obtained path difference will be proportional to the direction of stresses in the material of the tube, more specifically to half a difference between main stresses within the tube in compliance with Wertgehn's law). Having reached the rear end of the tube, said two beams are reflected from the specular layer 9 and return to the mirror 10 after deflection from the original direction under the effect of the tapered portion of the tube 8. If the mirror 10 has a specular layer, the beams will be reflected and transmitted to the mirror 9. The process will be repeated until the beams get into the transparent section of the mirror 10 leaving the wall of the tube 1. The outgoing beams 19 reach the translucent plate 15, are reflected therefrom, and travel through the polarizing filter 16 to the recorder 17, thus producing an interference pattern.

Analyzing the interference pattern it is possible to determine the direction and value of main deformations or stresses within the rock.

The deformograph sensitivity is adjusted to suit the particular material from which the tube 1 is fabricated by selecting the proper length of the tube 1, thickness of its walls and the number of beam reflections within the walls of the tube.

In another embodiment of the invention (FIG. 2) the tube 1 made of an optically sensitive material is located in the through borehole 2 between the chambers 3 and 20. The chamber 3 houses the polarized light source 6. The polarization recorder 7 is contained within the chamber 20. The end of the tube 1 arranged within the chamber 3 is made flat and provided with the mirror 10 having the transparent sections 11. The other end of the tube 1 contained within the chamber 20 has the tapered portion 8 in the form of a truncated cone and mounts the mirror 9 with the transparent sections 11. The transparent sections on the mirror 10 are displaced with respect to the transparent sections on the mirror 9.

Figure 2:
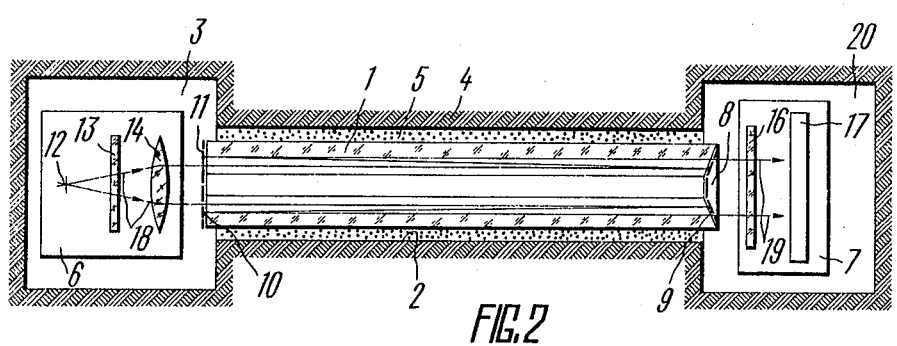
FIG. 2 is a general view of a deformograph according to the invention with the light source disposed on one side and the signal detector on the other side of a tube.
Figure 3:
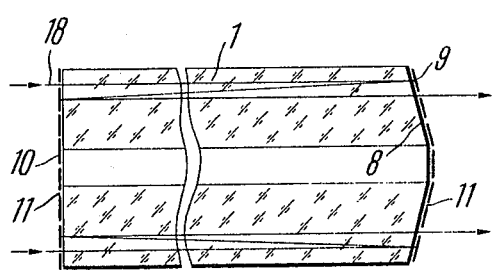
FIG. 3 is a general view of the tube with its one end representing a convex tapered portion.

The cone mirror 8 may be concave (FIGS. 1 and 2) or convex (FIG. 3).

Figure 4:
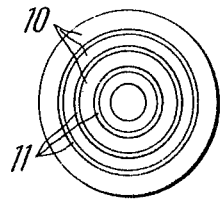
FIG. 4 depicts a specular coating with transparent sections representing concentric circles.

The transparent sections 11 on the specular layers 9 and 10 may represent concentric circles, as illustrated in FIG. 4, or a spiral or other suitable patterns.

The deformograph of FIG. 2 operates essentially in the same manner as the embodiment of FIG. 1.

The light beam 18 (FIG. 2) enters the wall of the tube 1 through the transparent section 11 on the mirror 10, reaches the opposite end of the tube 1, and gets on the specular layer 9 since the transparent sections on the specular layer 9 are displaced with respect to the transparent sections 11 on the specular layer 10. The light beam is reflected from the specular layer 9 and returns to the specular layer 10 being slightly deflected from the original direction due to the tapered portion 8. Thus, the light beam does not get on the transparent section 11 on the specular layer 10. It reaches the specular section, is reflected therefrom, and comes to the specular layer 9. The process is continued until the light beam comes to the transparent section 11 on the specular layer 9 leaving the wall of the tube.

The width of the transparent sections 11 is chosen to suit specific sensitivity conditions under which the light beam passes the wall of the tube 1 as many times as needed.

The proposed deformographs permit simultaneously measuring three components of deformation tensor in the rock, if the material of the tube 1 is softer than the rock, or three components of stress tensor in the rock, if the tube material is harder than the rock.

The deformographs forming the subject of the present invention permit detailed study of various laws pertaining to deformation of the earth's crust in seismic regions. Information on three components of deformation tensor may, thus, be obtained by the use of a single device, which is an apparent advantage over the prior art rod deformographs furnishing data only on one component of deformation tensor. Moreover, the proposed deformographs allow measuring both deformations and stresses.

The deformographs in compliance with the invention may be utilized for studying deformation and stresses in the earth's crust prior to an earthquake. They are also suitable for analyzing tidal deformation and stresses in the earth's crust, technogenic deformations and stresses in the vicinity of large reservoirs, and tectonic movements of the earth's crust due to abyssal processes.

To provide deformation sensitivity of $10^{-8}$ or better, a tube of conventional optical glass should have an outside diameter of 6.0 cm, an inside diameter of 2 to 3.0 cm, and a length of 3.0 m. In this case it is sufficient for a light beam to pass the tube only two or three times.

The sensitivity may be increased by two more orders of magnitude by utilizing elementary compensators in taking the necessary readings.

What is claimed is:

1. A deformograph comprising a polarized light source designed to produce a light signal; a sensitive element shaped as a tube made of an optically sensitive material and fixed in a borehole by cementing the gap between said tube and walls of said borehole, one of ends of said sensitive element being tapered off and provided with a specular coating, while the other end facing said light source has a specular coating with transparent sections enabling passage of a light beam through the material of said sensitive element and its output after being reflected from the specular coating on the tapered end; a sensing unit designed to pick off from said sensitive element a useful light signal indicative of the changing condition of the earth's crust in a given area.

2. A deformograph as claimed in claim 1, wherein the tapered surface has transparent sections enabling output of a light beam to a sensing unit, said light beam coming from a light source disposed on the side of the opposite end.

3. A deformograph as claimed in claim 1, wherein the transparent sections represent concentric rings.

4. A deformograph as claimed in claim 1, wherein the sensitive element has a length providing deformation sensitivity of $10^{-8}$ to $10^{-10}$ in detecting deformation of the earth's crust.

5. A deformograph as claimed in claim 2, wherein the transparent sections represent concentric rings.

* * * * *